United States Patent
Park et al.

(10) Patent No.: US 9,460,851 B2
(45) Date of Patent: Oct. 4, 2016

(54) MULTILAYER CERAMIC ELECTRONIC COMPONENT AND BOARD HAVING THE SAME

(71) Applicant: SAMSUNG ELECTRO-MECHANICS CO., LTD., Suwon-Si, Gyeonggi-Do (KR)

(72) Inventors: Heung Kil Park, Suwon-Si (KR); Doo Young Kim, Suwon-Si (KR); Young Ghyu Ahn, Suwon-Si (KR)

(73) Assignee: SAMSUNG ELECTRO-MECHANICS CO., LTD., Suwon-Si, Gyeonggi-Do (KR)

(*) Notice: Subject to any disclaimer, the term of this patent is extended or adjusted under 35 U.S.C. 154(b) by 182 days.

(21) Appl. No.: 14/260,012

(22) Filed: Apr. 23, 2014

(65) Prior Publication Data

US 2015/0131199 A1 May 14, 2015

(30) Foreign Application Priority Data

Nov. 8, 2013 (KR) .......................... 10-2013-0135332

(51) Int. Cl.
| | |
|---|---|
| *H01G 4/30* | (2006.01) |
| *H01G 4/12* | (2006.01) |
| *H01G 2/06* | (2006.01) |
| *H01G 4/005* | (2006.01) |

(52) U.S. Cl.
CPC .................. *H01G 4/12* (2013.01); *H01G 2/06* (2013.01); *H01G 4/005* (2013.01); *H01G 4/30* (2013.01)

(58) Field of Classification Search
CPC .......... H01G 4/30; H01G 4/005; H01G 4/12; H01G 4/255

USPC .............. 361/301.2, 301.4, 306.1, 303–305, 361/321.1, 321.2
See application file for complete search history.

(56) References Cited

U.S. PATENT DOCUMENTS

| 7,092,236 B2* | 8/2006 | Lee .......................... H01G 4/30 |
| | | 361/303 |
| 2011/0056735 A1* | 3/2011 | Lee ........................ H01G 4/005 |
| | | 174/260 |

FOREIGN PATENT DOCUMENTS

| JP | 2000-195754 A | 7/2000 |
| JP | 2005-72452 | 3/2005 |
| KR | 10-2005-0071733 A | 7/2005 |
| KR | 10-2011-0027321 A | 3/2011 |

OTHER PUBLICATIONS

Korean Office Action issued in Korean Application No. 10-2013-0135332 dated Oct. 7, 2014, w/English translation.

* cited by examiner

*Primary Examiner* — Nguyen T Ha
(74) *Attorney, Agent, or Firm* — McDermott Will & Emery LLP

(57) ABSTRACT

A multilayer ceramic electronic component may include a ceramic body having a plurality of dielectric layers stacked in the ceramic body; a plurality of active layers including first and second internal electrodes disposed to be alternately exposed to the end surfaces of the ceramic body with the dielectric layers interposed between the first and second internal electrodes; and dummy layers disposed between the active layers.

15 Claims, 7 Drawing Sheets

US 9,460,851 B2

MULTILAYER CERAMIC ELECTRONIC COMPONENT AND BOARD HAVING THE SAME

CROSS-REFERENCE TO RELATED APPLICATION

This application claims the benefit of Korean Patent Application No. 10-2013-0135332 filed on Nov. 8, 2013, with the Korean Intellectual Property Office, the disclosure of which is incorporated herein by reference.

BACKGROUND

The present disclosure relates to a multilayer ceramic electronic component and a board having the same.

Electronic components using a ceramic material include a capacitor, an inductor, a piezoelectric element, a varistor, a thermistor, and the like.

Among ceramic electronic components, a multilayer ceramic capacitor (MLCC) has advantages such as compactness, guaranteed high capacitance, and ease of mounting.

Such an MLCC is a chip-type condenser mounted on circuit boards of various electronic products including display devices such as liquid crystal displays (LCDs), plasma display panels (PDPs) and the like, as well as including computers, personal digital assistants (PDA), mobile phones, and the like, to serve to charge and discharge electricity.

An MLCC may include a plurality of stacked dielectric layers, internal electrodes having different polarities and opposed to each other with the dielectric layers interposed therebetween, and external electrodes electrically connected to the internal electrodes.

Since the dielectric layer has piezoelectric and electrostrictive properties, a piezoelectric phenomenon occurs between the internal electrodes when a direct current (DC) or alternating current (AC) voltage is applied to the multilayer ceramic capacitor, such that vibrations may be generated.

These vibrations may be transferred to a board on which the multilayer ceramic capacitor is mounted through external electrodes of the multilayer ceramic capacitor, such that the entirety of the board is a sound radiating surface to generate a vibration sound, noise.

The vibration sound may be within an audio frequency range of 20 to 20,000 Hz, which may cause listener discomfort and is referred to as an acoustic noise.

SUMMARY

An aspect of the present disclosure may provide a multilayer ceramic electronic component allowing for an effective reduction in noise caused by vibrations due to a piezoelectric phenomenon.

According to an aspect of the present disclosure, a multilayer ceramic electronic component comprising: a ceramic body having a plurality of dielectric layers stacked in the ceramic body; a plurality of active layers including first and second internal electrodes disposed to be alternately exposed to both end surfaces of the ceramic body with the dielectric layers interposed between the first and second internal electrodes; and dummy layers disposed between the active layers.

Each of the active layers may include a plurality of first internal electrodes and a plurality of second internal electrodes.

Each of the active layers may only include a single first internal electrode and a single second internal electrode.

The dummy layers may be formed by stacking the plurality of dielectric layers of the ceramic body.

Materials for forming the dummy layers may include a solid solution of $(Ba_{1-x}Ca_x)_m(Ti_{1-y}Zr_y)O_3$, $BaTiO_3$, $PbTiO_3$, and $SrTiO_3$, provided as ferroelectric substances, as well as $(Ca,Sr)(Ti,Zr)O_3$, $BaO$—$TiO_2$—$Nd_2O_3$, and $CaTiO_3$—$MgTiO_3$, provided as paraelectric substances.

Each of the dummy layers may have a thickness of 5 μm to 200 μm.

Each of the dummy layers may have a thickness equal to 1.5 times or more that of a single dielectric layer provided in the active layers.

The respective dummy layers may have the same thickness as one another.

The respective dummy layers may have different thicknesses.

Upper and lower cover layers may be formed on upper and lower portions of the ceramic body, respectively.

The upper and lower cover layers may be formed by stacking the plurality of dielectric layers of the ceramic body.

The multilayer ceramic electronic component may further include first and second external electrodes formed on both end surfaces of the ceramic body and electrically connected to the first and second internal electrodes, respectively.

According to another aspect of the present disclosure, a board having a multilayer ceramic electronic component may include: a substrate having first and second electrode pads formed thereon; and the multilayer ceramic electronic component installed on the first and second electronic pads.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
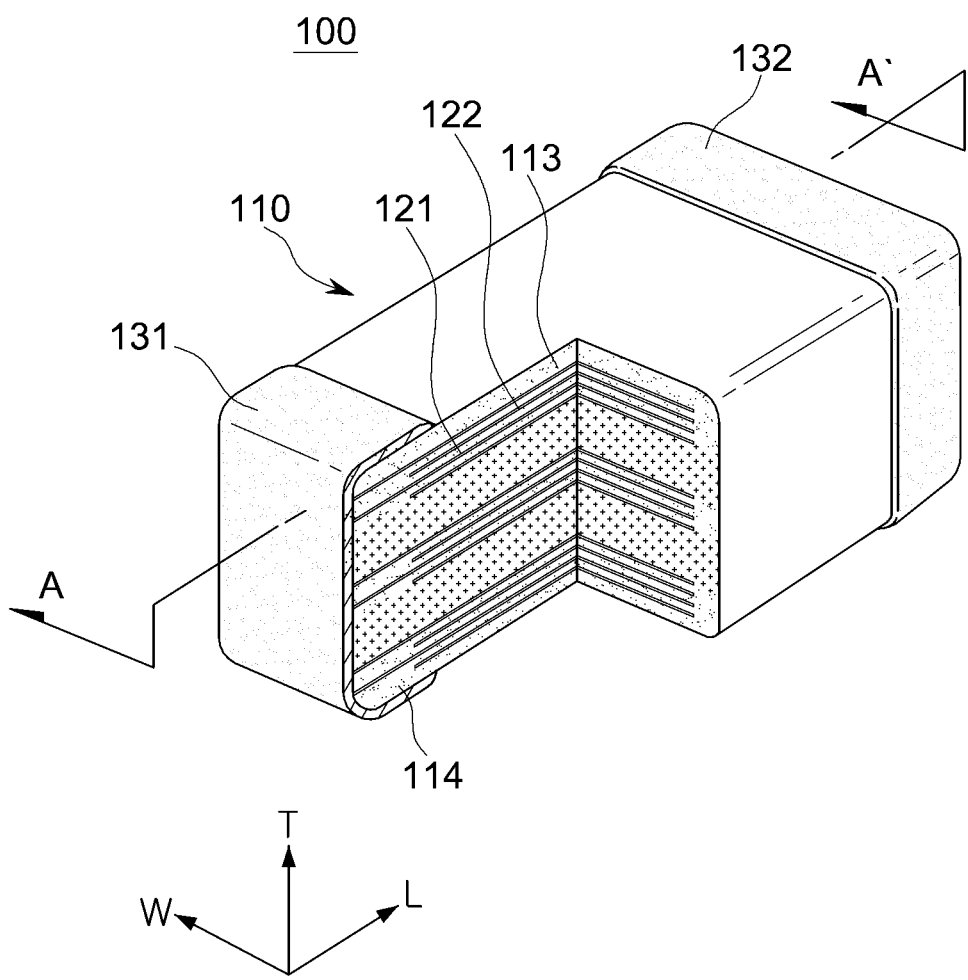
FIG. 1 is a partially cutaway perspective view schematically illustrating a multilayer ceramic capacitor (MLCC) according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Hereinafter, a multilayer ceramic electronic component according to an exemplary embodiment of the present disclosure will be described as a multilayer ceramic capacitor, by way of example, but the present disclosure is not limited thereto.

Multilayer Ceramic Capacitor (MLCC)

FIG. 1 is a partially cutaway perspective view schematically illustrating a multilayer ceramic capacitor (MLCC) according to an exemplary embodiment of the present disclosure.

Referring to FIG. 1, a multilayer ceramic capacitor (MLCC) 100 according to the exemplary embodiment may include a ceramic body 110, active layers 111 including a plurality of first and second internal electrodes 121 and 122 and dummy layers 112 disposed between the active layers 111.

First and second external electrodes 131 and 132 may be formed on both end surfaces of the ceramic body 110 to be electrically connected to the first and second internal electrodes 121 and 122, respectively.

The ceramic body 110 is formed by stacking a plurality of dielectric layers in a thickness direction and subsequently sintering the same, and a shape and dimensions of the ceramic body 110 and the number of stacked dielectric layers may not be limited to those illustrated in the exemplary embodiment.

Also, the plurality of dielectric layers forming the ceramic body 110 may be in a sintered state may integrated such that boundaries therebetween may not be readily apparent without using a scanning electron microscope (SEM).

The ceramic body 110 may have, for example, a hexahedral shape, but the shape of the ceramic body 110 is not particularly limited.

In the exemplary embodiment, surfaces of the ceramic body 110 opposing each other in the thickness direction will be defined as main surfaces, surfaces of the ceramic body 110 connecting the both main surfaces and opposing each other in a length direction will be defined as end surfaces, and surfaces of the ceramic body 110 connected to both end surfaces thereof to be perpendicular thereto and opposing each other in a width direction will be defined as side surfaces.

Directions of the ceramic body 110 will be defined in order to clearly describe exemplary embodiments of the present disclosure. L, W and T shown in the accompanying drawings refer to a length direction, a width direction, and a thickness direction of the ceramic body 110, respectively.

Here, the thickness direction may be used to have the same concept as that of a direction in which the dielectric layers are stacked.

Figure 2:
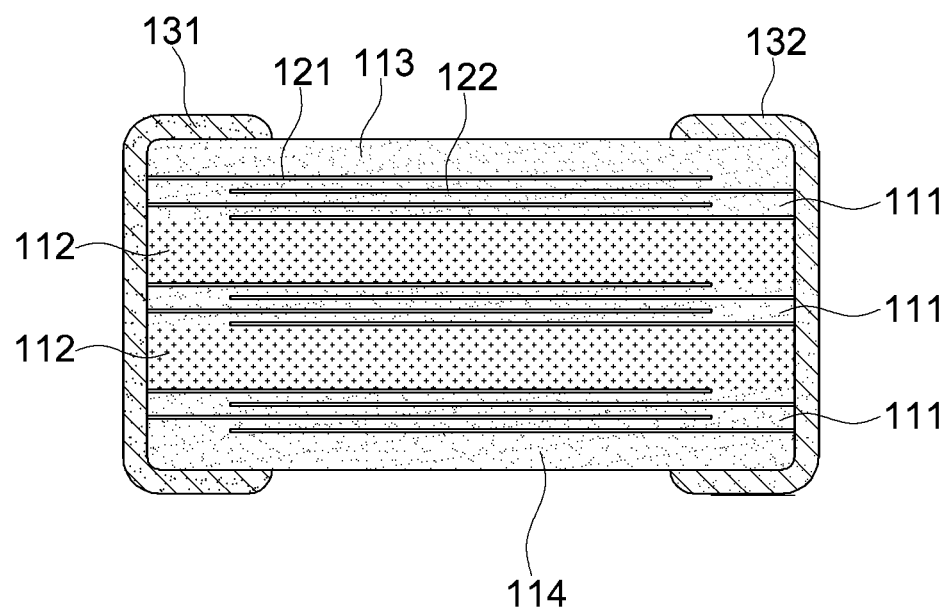
FIG. 2 is a cross-sectional view taken along line A-A' of FIG. 1.

FIG. 2 is a cross-sectional view taken along line A-A' of FIG. 1.

Referring to FIG. 2, each of the active layers 111, a part contributing to capacitance formation of the capacitor, may include a plurality of first and second internal electrodes 121 and 122 formed to be alternately exposed to the both end surfaces of the ceramic body 110 with the dielectric layers interposed therebetween.

In the exemplary embodiment, each active layer 111 may include two first internal electrodes 121 and two second internal electrodes 122, but the present disclosure is not limited thereto.

Each of the dummy layers 112 may be disposed between the active layers 111.

Also, at least two dummy layers 112 may be disposed within the ceramic body 110 in the thickness direction.

In this case, the dummy layers 112 may be formed by stacking at least one or more dielectric layers constituting the active layer 111 of the ceramic body 110.

Also, materials for forming the dummy layers 112 may include a solid solution of $(Ba_{1-x}Ca_x)_m(Ti_{1-y}Zr_y)O_3$, $BaTiO_3$, $PbTiO_3$, and $SrTiO_3$, provided as ferroelectric substances, as well as (Ca,Sr) (Ti,Zr) $O_3$, $BaO—TiO_2—Nd_2O_3$, and $CaTiO_3—MgTiO_3$, provided as paraelectric substances, as needed.

Also, each of the dummy layers 112 may have a thickness equal to or greater than 5 μm, and preferably, may have a thickness of 5 μm to 200 μm. Also, the thickness of the dummy layer 112 may be 1.5 times or more that of a single dielectric layer included in the active layer 111.

Also, the respective dummy layers 112 may have the same thickness as one another, or a portion or the entirety of the dummy layers 112 may have different thicknesses.

Meanwhile, the ceramic body 110 may have upper and lower cover layers 113 and 114 formed on an upper portion of the uppermost active layer 111 and a lower portion of the lowermost active layer 111, respectively.

The upper and lower cover layers 113 and 114 may be formed of the same material and have the same configuration as those of the dielectric layers of the active layers 111, except that the upper and lower cover layers 113 and 114 do not include the internal electrodes.

Also, the upper and lower cover layers 113 and 114 may be formed by stacking a single dielectric layer or two or more dielectric layers on upper and lower surfaces of the uppermost and lowermost active layers 111 in the thickness direction. Basically, the upper and lower cover layers 113 and 114 may serve to prevent damage to the first and second internal electrodes 121 and 122 due to physical or chemical stress.

The first and second internal electrodes 121 and 122 having different polarities may be formed by printing a conductive paste including a conductive metal on the respective dielectric layers 111 at a predetermined thickness.

In this case, the first and second internal electrodes 121 and 122 may be formed to be alternately exposed to the both end surfaces of the ceramic body 110 in the stacking direction of the dielectric layers, while having the dielectric layers interposed therebetween. In this case, the first and second internal electrodes 121 and 122 may be electrically insulated from each other by the dielectric layers disposed therebetween.

Also, the first and second internal electrodes 121 and 122 may be electrically connected to the first and second external electrodes 131 and 132 through portions thereof alternately exposed to the both end surfaces of the ceramic body 110.

Thus, when a voltage is applied to the first and second external electrodes 131 and 132, electrical charges are accumulated between the first and second internal electrodes 121 and 122 opposed to each other, and in this case, a capacitance of the MLCC 100 may be proportional to an area of regions in which the first and second internal electrodes 121 and 122 overlap each other in the respective active layers 111.

A thickness of the first and second internal electrodes 121 and 122 may be determined according to an intended usage thereof. For example, a thickness of the first and second internal electrodes 121 and 122 may be determined within a range of 0.2 µm to 1.0 µm in consideration of a size of the ceramic body 110, for example, but the present disclosure is not limited thereto.

Also, a conductive metal contained in a conductive paste for forming the first and second internal electrodes 121 and 122 may be formed of one of silver (Ag), palladium (Pd), platinum (Pt), nickel (Ni), and copper (Cu), or an alloy thereof, or the like, but the present disclosure is not limited thereto.

Also, as a printing method of the conductive paste, a screen printing method, a gravure printing method, or the like, may be used, but the present disclosure is not limited thereto.

The first and second external electrodes 131 and 132 may be formed on the both end surfaces of the ceramic body 110 and may be in contact with the exposed portions of the first and second internal electrodes 121 and 122 to be electrically connected thereto.

The first and second external electrodes 131 and 132 may be formed of a conductive paste including a conductive metal, and the conductive metal may be Ag, Ni, Cu, or an alloy thereof, but the present disclosure is not limited thereto.

Meanwhile, first and second plating layers (not shown) may be formed on the first and second external electrodes 131 and 132 as needed.

The first and second plating layers may be provided to increase bonding strength between the MLCC 100 and a board when the MLCC 100 is mounted on the board by soldering.

For example, the first and second plating layers may have a structure including nickel (Ni) plating layers formed on the first and second external electrodes 131 and 132 and tin (Sn) plating layers formed on the nickel plating layers, but the present disclosure is not limited thereto.

In the exemplary embodiment, each of the active layers 111 may be configured to include the plurality of first internal electrodes 121 and the plurality of second internal electrodes 122, but the present disclosure is not limited thereto.

Figure 3:
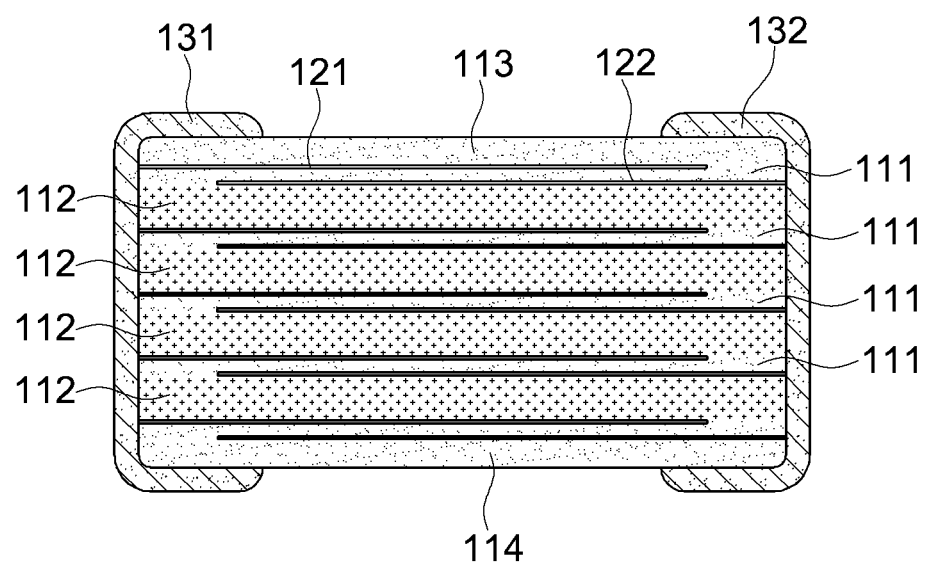
FIG. 3 is a cross-sectional view illustrating an MLCC according to another exemplary embodiment of the present disclosure, taken in length and thickness directions thereof.

For example, as illustrated in FIG. 3, according to another exemplary embodiment, only a single first internal electrode 121 and a single second internal electrode 122 may be included in each active layer 111, and the ceramic body 110 may be configured by alternately stacking the active layers 111 with the dummy layers 112 interposed therebetween.

Here, since a formation structure of the first and second external electrodes 131 and 132 and the upper and lower cover layers 113 and 114 may be identical to that of the foregoing exemplary embodiment as described above, a detailed description thereof will be omitted to avoid redundancy.

Board Having MLCC

Figure 4:
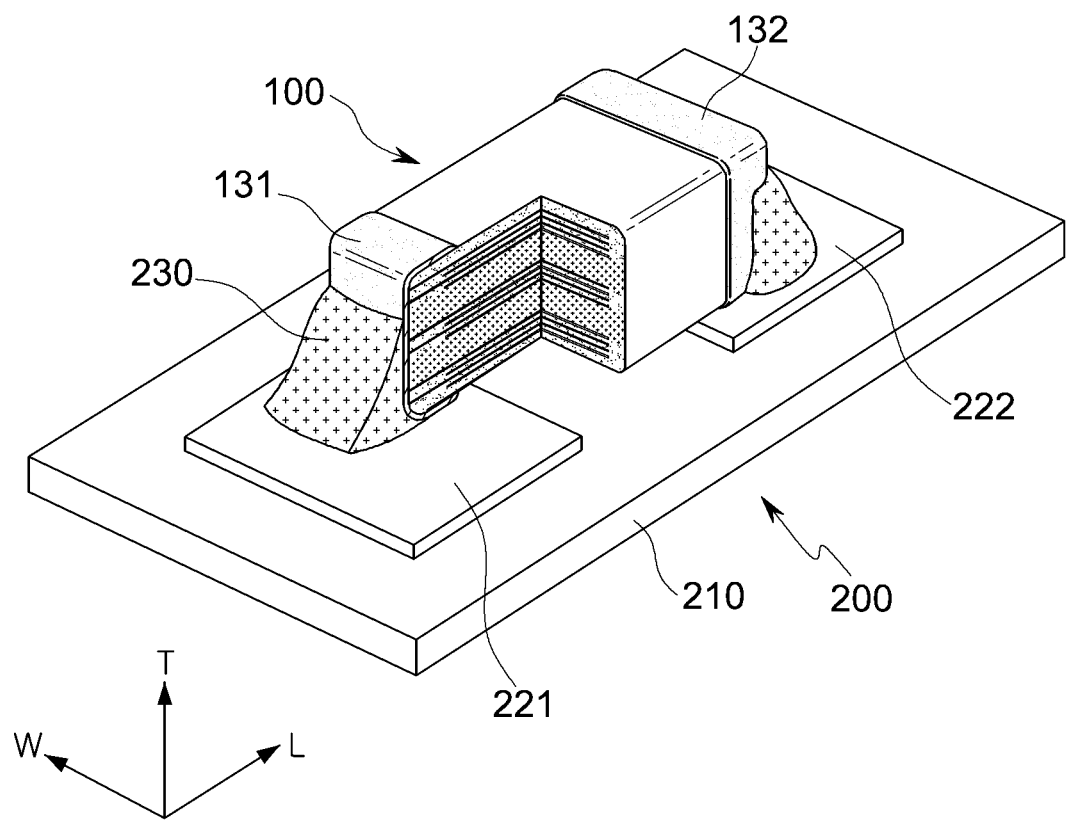
FIG. 4 is a partially cut-away perspective view schematically illustrating a state in which the multilayer ceramic capacitor (MLCC) according to the exemplary embodiment of the present disclosure is mounted on a board.
Figure 5:
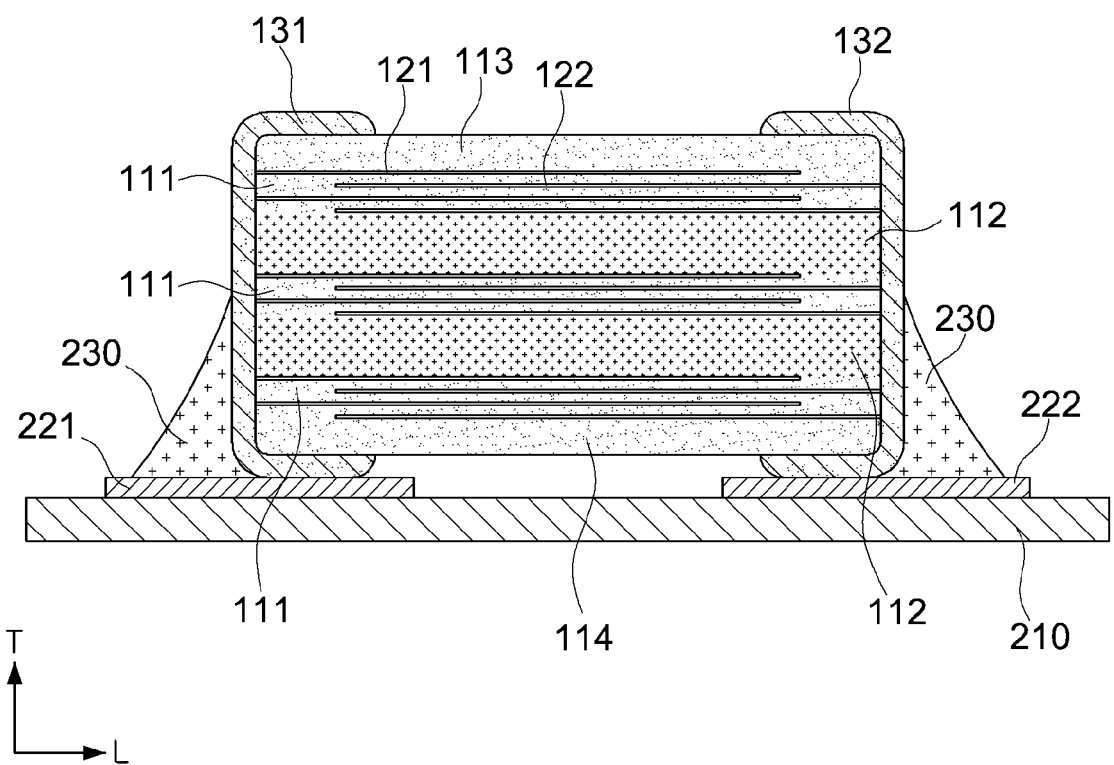
FIG. 5 is a cross-sectional view illustrating the board of FIG. 4 taken in length and thickness directions thereof.

FIG. 4 is a partially cut-away perspective view schematically illustrating a state in which the multilayer ceramic capacitor (MLCC) according to the exemplary embodiment of the present disclosure is mounted on a board. FIG. 5 is a cross-sectional view illustrating the board of FIG. 4 taken in length and thickness directions thereof.

Referring to FIGS. 4 and 5, a board 200 having the MLCC 100 according to the exemplary embodiment may include a substrate 210 on which the MLCC 100 is horizontally mounted and first and second electrode pads 221 and 222 formed on an upper surface of the substrate 210 to be spaced apart from each other.

Here, the MLCC 100 may be electrically connected to the substrate 210 by soldering parts 230 in a state in which the lower cover layer 114 of the MLCC 100 is disposed downwardly and the first and second external electrodes 131 and 132 are positioned on the first and second electrode pads 221 and 222 to be in contact therewith.

In the state in which the MLCC 100 is mounted on the substrate 210, when a voltage is applied to the MLCC 100, acoustic noise may be generated.

Here, sizes of the first and second electrode pads 221 and 222 may be used as an indicator for determining an amount of the soldering parts 230 connecting the first and second external electrodes 131 and 132 of the MLCC 100 and the first and second electrode pads 221 and 222, and a magnitude of acoustic noise may be adjusted according to the amount of the soldering parts 230.

Figure 6:
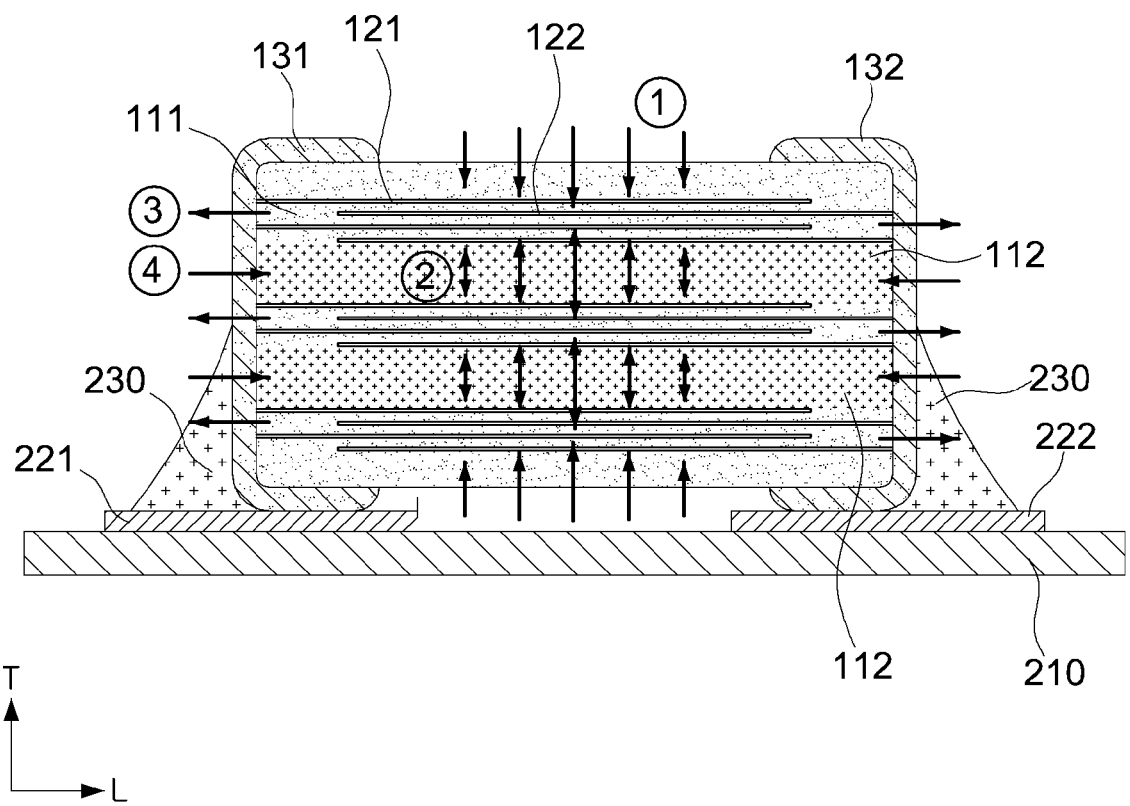
FIG. 6 is a cross-sectional view schematically illustrating a form in which respective active layers of the MLCC illustrated in FIG. 4 contract when a voltage is applied to the MLCC mounted on a board.
Figure 7:
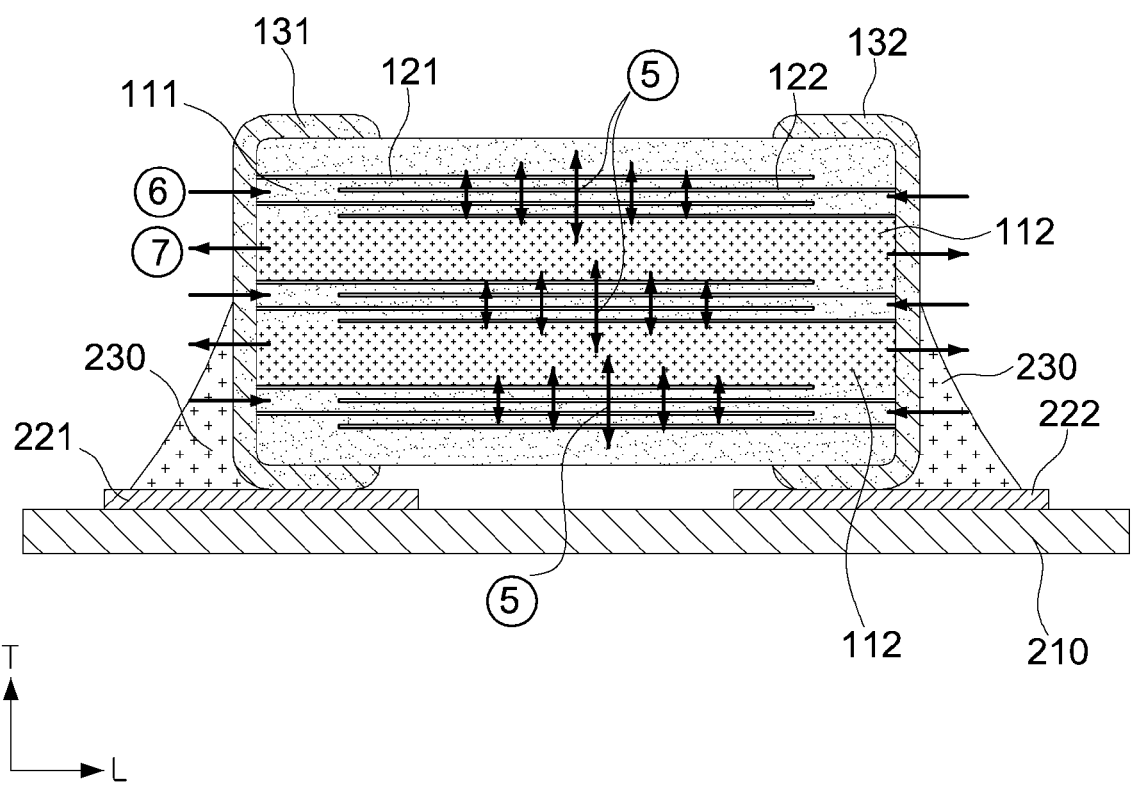
FIG. 7 is a cross-sectional view schematically illustrating a form in which the respective active layers of the MLCC illustrated in FIG. 4 expand when a voltage is applied to the MLCC mounted on the board.

FIG. 6 is a cross-sectional view schematically illustrating a form in which the respective active layers 111 of the MLCC illustrated in FIG. 4 contract when a voltage is applied to the MLCC mounted on a board, and FIG. 7 is a cross-sectional view schematically illustrating a form in which the respective active layers 111 of the MLCC illustrated in FIG. 4 expand when a voltage is applied to the MLCC mounted on the board.

Referring to FIGS. 6 and 7, in a state in which the MLCC 100 is mounted on the substrate 210, when voltages having different polarities are applied to the first and second external electrodes 131 and 132 formed on the both end surfaces of the MLCC 100, the ceramic body 110 may expand and contract in the thickness direction due to the inverse piezoelectric effect of the dielectric layers configuring the active layers 111, while both end surfaces of the ceramic body 110 on which the first and second external electrodes 131 and 132 are formed may contract and expand due to the Poisson effect, in a manner contrary to that of the expansion and contraction of the ceramic body 110 in the thickness direction.

Referring to FIG. 6, when the active layers 111 of the MLCC 100 have expansive force ③ in the length direction, the active layers 111 receive contractive force ① in the thickness direction, and on the other hand, the dummy layers 112 have contractive force ④ in the length direction due to a difference in dielectric constants between the active layers 111 and the dummy layers 112 and accordingly, receive expansive force ② in the thickness direction.

Referring to FIG. 7, when the active layers 111 of the MLCC 100 have contractive force in the length direction, the active layers 111 receive expansive force in the thickness direction, and on the other hand, the dummy layers 112 have expansive force in the length direction due to the difference in dielectric constants between the active layers 111 and the dummy layers 112 and accordingly, receive contractive force in the thickness direction.

Thus, in the exemplary embodiment, when voltages are applied to the MLCC 100, the active layers 111 and the dummy layers 112 of the MLCC 100 may expand and contract in a reverse manner, cancelling out mutual stress between the active layers 111 and the dummy layers 112, thus reducing acoustic noise.

As set forth above, according to exemplary embodiments of the present disclosure, a ceramic body may be formed such that active layers including internal electrodes and dummy layers having no internal electrodes are alternately stacked and thus, expansion and contraction stress caused by a piezoelectric behavior generated in the active layers may be cancelled out by stress generated in the dummy layers in a reverse manner to that of the active layers, whereby vibrations generated in an MLCC may be reduced, and thus, acoustic noise generated due to the vibrations transferred from the MLCC to a board may be reduced.

While exemplary embodiments have been shown and described above, it will be apparent to those skilled in the art that modifications and variations could be made without departing from the spirit and scope of the present disclosure as defined by the appended claims.

What is claimed is:

1. A multilayer ceramic electronic component comprising:
    a ceramic body having a plurality of dielectric layers stacked in the ceramic body;
    a plurality of active layers including first and second internal electrodes disposed to be alternately exposed to end surfaces of the ceramic body, the dielectric layers being interposed between the first and second internal electrodes; and
    dummy layers disposed between the active layers,
    wherein materials for forming the dielectric layers and the dummy layers include a solid solution of $(Ba_{1-x}Ca_x)_m(Ti_{1-y}Zr_y)O_3$, $BaTiO_3$, $PbTiO_3$, and $SrTiO_3$ provided as ferroelectric substances.

2. The multilayer ceramic electronic component of claim 1, wherein each of the active layers includes a plurality of first internal electrodes and a plurality of second internal electrodes.

3. The multilayer ceramic electronic component of claim 1, wherein each of the active layers only includes a single first internal electrode and a single second internal electrode.

4. The multilayer ceramic electronic component of claim 1, wherein the dummy layers are formed by stacking the plurality of dielectric layers of the ceramic body.

5. The multilayer ceramic electronic component of claim 1, wherein each of the dummy layers has a thickness of 5 μm to 200 μm.

6. The multilayer ceramic electronic component of claim 1, wherein each of the dummy layers has a thickness equal to 1.5 times or more that of a single dielectric layer provided in the active layers.

7. The multilayer ceramic electronic component of claim 1, wherein at least two dummy layers are disposed within the ceramic body.

8. The multilayer ceramic electronic component of claim 1, wherein the respective dummy layers have the same thickness as one another.

9. The multilayer ceramic electronic component of claim 1, wherein the respective dummy layers have different thicknesses.

10. The multilayer ceramic electronic component of claim 1, wherein upper and lower cover layers are formed on upper and lower portions of the ceramic body, respectively.

11. The multilayer ceramic electronic component of claim 10, wherein the upper and lower cover layers are formed by stacking the plurality of dielectric layers of the ceramic body.

12. The multilayer ceramic electronic component of claim 1, further comprising: first and second external electrodes formed on the both end surfaces of the ceramic body and electrically connected to the first and second internal electrodes, respectively.

13. A board having a multilayer ceramic electronic component, comprising:
    a substrate having first and second electrode pads formed thereon; and
    the multilayer ceramic electronic component of claim 1 installed on the first and second electronic pads.

14. The multilayer ceramic electronic component of claim 1, wherein the materials for forming the dielectric layers and the dummy layers further include $(Ca,Sr)(Ti,Zr)O_3$, $BaO$—$TiO_2$—$Nd_2O_3$, and $CaTiO_3$—$MgTiO_3$, provided as paraelectric substances.

15. A multilayer ceramic electronic component comprising:
    a ceramic body having a plurality of dielectric layers stacked in the ceramic body;
    a plurality of active layers including first and second internal electrodes disposed to be alternately exposed to end surfaces of the ceramic body, the dielectric layers being interposed between the first and second internal electrodes; and
    dummy layers disposed between the active layers,
    wherein materials for forming the dielectric layers and the dummy layers include $(Ca,Sr)(Ti,Zr)O_3$, $BaO$—$TiO_2$—$Nd_2O_3$, and $CaTiO_3$—$MgTiO_3$, provided as paraelectric substances.

* * * * *